(12) United States Patent
Jubert et al.

(10) Patent No.: US 11,105,441 B2
(45) Date of Patent: Aug. 31, 2021

(54) METHOD OF CONTROLLING A THREE-POSITION SLIDE VALVE

(71) Applicant: SAFRAN LANDING SYSTEMS, Velizy Villacoublay (FR)

(72) Inventors: Xavier Jubert, Moissy-Cramayel (FR); Xavier Leclerc, Moissy-Cramayel (FR); Sébastien Ernis, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/453,226

(22) Filed: Jun. 26, 2019

(65) Prior Publication Data

US 2020/0003332 A1   Jan. 2, 2020

(30) Foreign Application Priority Data

Jun. 27, 2018   (FR) ...................................... 1855783

(51) Int. Cl.
*F16K 47/02*   (2006.01)
*F16K 11/07*   (2006.01)
(Continued)

(52) U.S. Cl.
CPC ............ *F16K 47/023* (2013.01); *F16K 11/07* (2013.01); *F16K 31/122* (2013.01); *F15B 13/02* (2013.01);
(Continued)

(58) Field of Classification Search
CPC ...... F16K 47/023; F16K 11/07; F16K 31/122; F15B 13/0402; F15B 13/042; F15B 13/02;
(Continued)

(56) References Cited

U.S. PATENT DOCUMENTS 3,742,980 A * 7/1973 Byers, Jr. ............... E02F 9/2228
                                                                137/625.62
4,434,966 A * 3/1984 Zajac ................... F15B 13/0402
                                                                137/270
(Continued)

FOREIGN PATENT DOCUMENTS

FR           2 214 051 A1      8/1974

OTHER PUBLICATIONS

Search Report issued in corresponding French Application No. 1855783 filed Jun. 27, 2018, 2 pages.

*Primary Examiner* — Kenneth Rinehart
*Assistant Examiner* — Patrick C Williams
(74) *Attorney, Agent, or Firm* — Christensen O'Connor Johnson Kindness PLLC

(57) ABSTRACT

A method of controlling a hydraulic valve includes putting a first control chamber under pressure and putting a second control chamber to return so as to cause a slide to move into one of two end positions, putting a second control chamber under pressure and putting the first control chamber to return, thereby causing the slide to move into the other one of the two end positions. An intermediate step of applying pressure to the one of the first or second control chamber that was connected to return can be provided so that both control chambers are maintained simultaneously under pressure for a determined length of time.

3 Claims, 1 Drawing Sheet

(51) Int. Cl.
  *F16K 31/122*  (2006.01)
  *F15B 13/042*  (2006.01)
  *F15B 13/02*   (2006.01)
  *F15B 13/04*   (2006.01)
  *F15B 20/00*   (2006.01)

(52) U.S. Cl.
  CPC ......... *F15B 13/0402* (2013.01); *F15B 13/042* (2013.01); *F15B 20/007* (2013.01); *F15B 2013/0412* (2013.01); *F15B 2211/3127* (2013.01); *F15B 2211/329* (2013.01); *F15B 2211/863* (2013.01)

(58) Field of Classification Search
  CPC ............ F15B 20/007; F15B 2013/0412; F15B 2211/3127; F15B 2211/329; F15B 2211/863; Y10T 137/86694; Y10T 137/8671
  See application file for complete search history.

(56) References Cited

U.S. PATENT DOCUMENTS

2005/0120873 A1*  6/2005  Gray, Jr. ................... F15B 9/14
                                                91/418
2013/0276915 A1* 10/2013  Liukkunen .............. F16K 31/12
                                                137/488
2019/0322258 A1* 10/2019  Besliu ..................... F16K 11/07

\* cited by examiner

METHOD OF CONTROLLING A THREE-POSITION SLIDE VALVE

CROSS REFERENCE TO RELATED APPLICATION

This application claims priority under 35 U.S.C. § 119 to French Patent Application No. 1855783 filed Jun. 27, 2018, which is herein incorporated by reference in its entirety.

BACKGROUND

The present disclosure generally relates to methods of controlling a hydraulically controlled hydraulic slide valve having three positions, including a stable central position. Document FR 2 214 051 discloses hydraulic slide valves in which the slide is mounted to move in a cylinder and is urged towards a stable central position by centering springs. The slide can be moved into end positions on either side of the central position by delivering a fluid under pressure into respective control chambers. Those valves are used in particular for feeding the chambers of an actuator for operating an aircraft undercarriage so that it moves between a retracted position and a deployed position, or indeed the chambers of an actuator for operating hatches that close the well for receiving the undercarriage in the retracted position. In general, the valve is of the type having four ports with a feed port, a return port, and two service ports connected to the chambers of the actuator. In the end positions, the valve connects the feed port to one of the chambers and the return port to the other chamber. In the central position, the valve connects both chambers to the return port.

In certain aircraft in which the feed pressure is particularly high (typically 350 bars), pressure peaks have been observed when changing direction in the movement controlled by the actuator. Changing direction implies putting the control chamber of the slide that was previously under pressure to the return, while putting the other control chamber under pressure in order to cause the slide to pass from one end position to the other. During this reversal, the pipes connecting the valve to the actuator are connected to return while the slide passes through the central position, thereby leading to a sudden drop in pressure in the line that was previously pressurized. These pressure peaks are due to the depressurization of the pipes passing suddenly from feed pressure to return pressure.

SUMMARY

The present disclosure provides methods of controlling a slide valve that enables pressure peaks to be reduced.

In an aspect, the present disclosure provides a method of controlling a hydraulic valve. The hydraulic valve in an embodiment has a feed port, a return port, and two service ports, together with a slide that is movably mounted in a cylinder to move between two end positions. In one end position, the slide puts the feed port into communication with one of the service ports and the return port into communication with the other service port. In the other end position, the slide puts the service port that was in communication with the return port into communication with the feed port. The slide passes through a stable central position in which the valve puts the return port into communication with one of the two service ports. The cylinder defines first and second control chambers for controlling the slide. In some embodiments, the method includes:

putting the first control chamber under pressure and putting the second control chamber to return so as to cause the slide to move into one of the end positions; and putting the second control chamber under pressure and putting the first control chamber to return, thereby causing the slide to move into the other one of the end positions.

In an embodiment, an intermediate step is provided between the two above-mentioned steps that includes applying pressure to the control chamber that was connected to return so that both chambers are maintained simultaneously under pressure for a determined length of time.

Pressurizing both control chambers simultaneously cancels the hydraulic forces acting on the slide. The slide returns towards the central position solely under the effect of centering springs, and the pressures that are maintained in this way prevent the slide from oscillating. The movement of the slide is much more progressive, such that the pipe associated with the outlet port that is connected to the feed becomes depressurized progressively, thereby reducing any risk for a pressure peak. Thereafter, after a determined length of time, it suffices to disconnect pressure from the control chamber that was initially pressurized in order to bring the slide into the other end position, such that the time for switching the slide from one end position to the other is fast.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
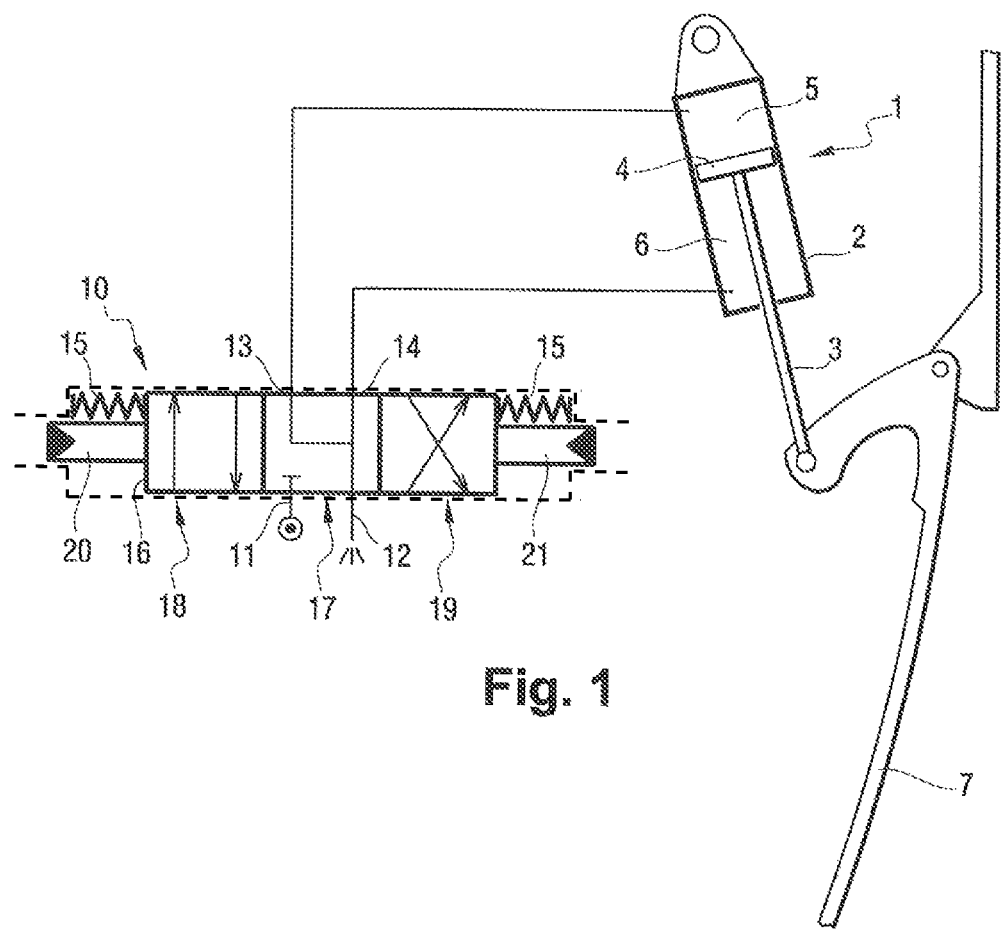
FIG. 1 shows a hydraulic diagram of an actuator fed by a slide valve.
Figure 2:
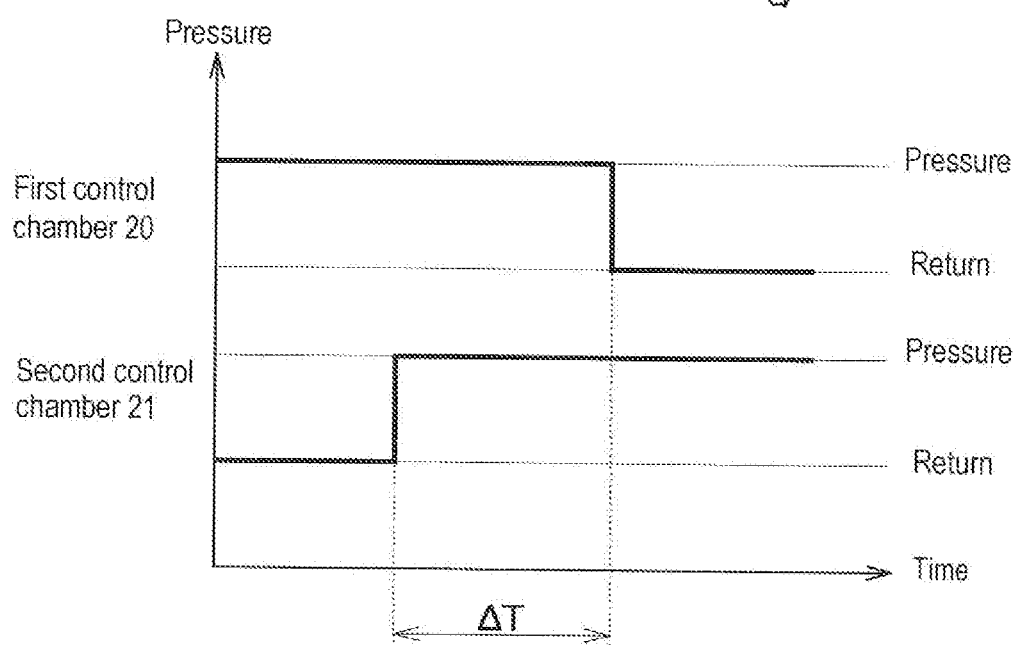
FIG. 2 shows a timing chart of the pressures in the two control chambers of the slide valve.

The hydraulic diagram shown in FIG. 1 concerns feeding hydraulic fluid to an actuator 1 comprising a cylinder 2 in which a rod 3 slides by being associated with a piston 4 that defines an extension chamber 5 and a retraction chamber 6 in the cylinder 2. By way of example, the actuator is used for moving a door 7 of a wheel well for an aircraft undercarriage. During the sequence for deploying the undercarriage, the door is opened and then it is closed. The two chambers 5 and 6 of the actuator 1 are fed with fluid under pressure via a slide valve 10 that has a feed port 11, a return port 12, and service ports 13 and 14 that are connected respectively to the extension chamber 5 and to the retraction chamber 6 of the actuator 1. The valve 10 comprises a cylinder in which a slide 16 is slidably mounted. The slide 16 is urged towards a stable central position 17 by centering springs 15. In this position, the slide 16 connects the service ports 13 and 14 to the return port 12 so that both chambers 5 and 6 of the actuator 1 are connected to return.

The slide 16 may be moved towards first and second end positions 18 and 19 on either side of the central position, and in which, respectively:

the feed port 11 is connected to the extension chamber 5 and the return port 12 is connected to the retraction chamber 6; and the feed port 11 is connected to the retraction chamber 6 and the return port 12 is connected to the extension chamber 5.

The valve cylinder 10 defines first and second control chambers 20 and 21 (each represented by the standardized black triangle symbol in FIG. 1). The slide 16 is moved towards the first end position 18 by pressurizing the first control chamber 20 and by connecting the second control chamber 21 to return. The slide 16 is moved towards the second end position 19 by pressurizing the second control chamber 21 and connecting the first control chamber 20 to return.

In certain sequences, it is necessary to cause the actuator 1 to extend and then to retract. By way of example, this may involve opening and then closing the wheel well door 7 once the undercarriage is deployed. In the method of the present disclosure, the procedure is as follows:

when the actuator 1 is operated to extend, the first control chamber 20 is pressurized while the second control chamber 21 is connected to return, thereby causing the slide 16 to move towards the first end position 18, and thus causing the actuator 1 to be extended;

thereafter, when the actuator is to be retracted, the second control chamber 21 is pressurized, thereby balancing the hydraulic forces on the slide 16 so that it returns towards the central position 17 under the action of the centering springs 15; and after a determined length of time ΔT, the first control chamber 20 is connected to return, thereby causing the slide 16 to move (quickly) to the second end position 19, and thus causing the actuator 1 to retract.

The length of time ΔT is selected to leave enough time for the slide 16 to return to the central position 17, thereby putting the pipe that connects the valve 10 to the actuator 1 and also the chambers 5 and 6 of the actuator 1 to return pressure. The intermediate step of pressurizing both control chambers 20 and 21 of the valve 10 enables the various stages of pressurizing and depressurizing the pipes and the chambers of the actuator to be separated when changing the direction of movement of the actuator, thereby reducing any risk of pressure peaks. In addition, this simultaneous pressurizing of the control chambers 20 and 21 reduces any risk of the slide 16 oscillating, which could give rise to pressure oscillations in the pipes and the chambers of the actuator.

The present disclosure is not limited to the above description, but on the contrary covers any variant coming within the ambit defined by the claims.

In particular, the present disclosure applies equally to controlling an extension/retraction movement of the actuator, as described above, and to controlling a retraction/extension movement of the actuator, of the kind that is used for example to open the door. Retracting the actuator while the door is closed serves to unload the locking hook so as to make it easier to disengage prior to opening the door by causing the actuator to extend.

In addition, although the representative methods of the present disclosure as illustrated herein are applied to a valve having three positions and four ports, in which the two service ports are put into communication with the feed port or with the return port, and with both connections being interchanged on going from one end position to the other, these methods may be applied to other types of slide valve, and in particular to those in which one of the end positions serves to put both service ports into communication with the feed port, in order to extend the actuator by differential action of pressure in the two chambers.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. The term "about," "approximately," etc., means plus or minus 5% of the stated value. The term "close to" a position means within 5% of that position.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A method of controlling a hydraulic valve having a feed port, a return port, a first service port, a second service port, a slide that is movably mounted in a cylinder to move between two end positions, in one of which end positions the slide puts the feed port into communication with one of the first or second service ports and the return port into communication with the other of the first or second service ports, and in the other end position the slide puts at least that one of the first and second service ports which was in communication with the return port into communication with the feed port, the slide being configured to return by centering springs towards a stable central position in which the hydraulic valve puts the return port into communication with one of the first and second service ports, the cylinder defining a first and a second control chamber for controlling the slide, the method comprising:

putting the first control chamber under pressure and putting the second control chamber to return so as to cause the slide to move into one of the two end positions;

putting the second control chamber under pressure and putting the first control chamber to return, thereby causing the slide to move into the other one of the two end positions; and an intermediate step of applying pressure to the second control chamber that was connected to return so that both of the first and second control chambers are maintained simultaneously under pressure for a determined length of time.

2. A method of controlling a hydraulic valve having a feed port, a return port, a first service port, a second service port, a slide that is movably mounted in a cylinder to move between a first end position and a second end position, wherein in the first end position the slide puts the feed port into communication with the first service port and the return port into communication with the second service port, wherein in the second end position the slide puts the second service port into communication with the feed port, the slide being configured to return by centering springs towards a stable central position in which the return port is in communication with the first and second service ports, the cylinder defining a first and a second control chamber for controlling the slide, the method comprising:

pressurizing the first control chamber and connecting the second control chamber to the return port, to cause the slide to move into the first end position;

pressurizing the second control chamber and connecting the first control chamber to the return port, to cause the slide to move into the second end position; and an intermediate step of pressurizing the second control chamber so that the first control chamber and the second control chamber are maintained simultaneously under pressure for a determined length of time that allows the slide to return to the stable central position.

3. The method of claim 1, wherein applying pressure to the second control chamber that was connected to return so that both of the first and second control chambers are maintained simultaneously under pressure for the determined length of time comprises balancing hydraulic forces on the slide so that the slide returns towards the stable central position.

* * * * *